US012699168B2

(12) United States Patent
Lietz et al.

(10) Patent No.: US 12,699,168 B2
(45) Date of Patent: Aug. 4, 2026

(54) METHOD FOR CALIBRATING AND/OR ADJUSTING, AND CONTROL UNIT FOR A LiDAR SYSTEM, LiDAR SYSTEM, AND WORKING DEVICE

(71) Applicant: Robert Bosch GmbH, Stuttgart (DE)

(72) Inventors: Mario Lietz, Vaihingen an der Enz (DE); Alf Neustadt, Stuttgart (DE); Reiner Schnitzer, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 908 days.

(21) Appl. No.: 17/998,274

(22) PCT Filed: May 11, 2021

(86) PCT No.: PCT/EP2021/062421
§ 371 (c)(1),
(2) Date: Dec. 21, 2022

(87) PCT Pub. No.: WO2021/228815
PCT Pub. Date: Nov. 18, 2021

(65) Prior Publication Data
US 2023/0213634 A1 Jul. 6, 2023

(30) Foreign Application Priority Data

May 13, 2020 (DE) ..................... 10 2020 206 006.1

(51) Int. Cl.
*G01S 7/497* (2006.01)
*G01S 7/48* (2006.01)
(Continued)

(52) U.S. Cl.
CPC .......... *G01S 7/4972* (2013.01); *G01S 7/4804* (2013.01); *G01S 7/4865* (2013.01); *G01S 17/89* (2013.01)

(58) Field of Classification Search
None
See application file for complete search history.

(56) References Cited

U.S. PATENT DOCUMENTS 7,064,817 B1 * 6/2006 Schmitt ................ G01S 7/4972
356/3.01
2017/0124781 A1 5/2017 Douillard et al.

FOREIGN PATENT DOCUMENTS

CN 102353950 A 2/2012
CN 105510899 A 4/2016
(Continued)

OTHER PUBLICATIONS

Fiorani et al., "Self-Aligning lidar for the continuous monitoring of the atmosphere", Applied Optics, Optical Society of America vol. 37, No. 21 (1998), pp. 4758-4764.
(Continued)

*Primary Examiner* — Luke D Ratcliffe
(74) *Attorney, Agent, or Firm* — NORTON ROSE FULBRIGHT US LLP

(57) ABSTRACT

A method for calibrating and/or adjusting a lidar system. In the method, in order to perform a measurement-based comparison with respect to an underlying one-dimensionally or two-dimensionally detecting detector unit, a distribution of secondary light incident from the field of view and imaged onto the detector unit, and a center position and/or width of the distribution is/are acquired as position data and compared especially with presumed and/or expected position data featuring an expected center position and/or an expected distribution.

10 Claims, 5 Drawing Sheets

(51) Int. Cl.
    *G01S 7/4865*        (2020.01)
    *G01S 17/89*         (2020.01)

(56)             References Cited

FOREIGN PATENT DOCUMENTS

| | | | | |
|---|---|---|---|---|
| DE | 102009047303 A1 * | 6/2011 | ............ | G01S 17/74 |
| JP | 2017009574 A | 1/2017 | | |
| JP | 2021043131 A | 3/2021 | | |
| KR | 20000043447 A | 7/2000 | | |
| KR | 101055419 B1 | 8/2011 | | |
| WO | 2018202426 A1 | 11/2018 | | |
| WO | 2018234467 A1 | 12/2018 | | |
| WO | 2018234469 A1 | 12/2018 | | |

OTHER PUBLICATIONS

International Search Report for PCT/EP2021/062421, Issued Jul. 16, 2021.

* cited by examiner

METHOD FOR CALIBRATING AND/OR ADJUSTING, AND CONTROL UNIT FOR A LiDAR SYSTEM, LiDAR SYSTEM, AND WORKING DEVICE

FIELD

The present invention relates to a method for calibrating and/or adjusting, and a control unit for a LiDAR system, a LiDAR as such and to a working device, which is developed with a LiDAR system and as a vehicle, in particular.

BACKGROUND INFORMATION

To detect the environment of working devices and of vehicles, in particular, so-called LiDAR systems (Light Detection and Ranging) are increasingly used, which are designed to apply light or infrared radiation to a field of view and to acquire and evaluate radiation reflected from the field of view for an analysis of the field of view and the detection of objects included therein. The quality of the environment detection, especially in conjunction with the desired range of the detection, depends on the quality of the adjustment or alignment of the transmitter unit and receiver unit relative to each other. As a result, the corresponding alignment must be checked and possibly adapted during the installation and/or operation of a lidar system.

SUMMARY

A method according to the present invention offers the advantage that it is possible to check, set and/or adapt an alignment of the transmitter unit and the receiver unit of a lidar system relative to each other with the aid of especially simple means and without human resources. According to an example embodiment of the present invention, this is achieved by developing a method for calibrating and/or adjusting a lidar system in which, in order to perform a measurement-based comparison with respect to an underlying one- or two-dimensionally detecting detector unit of the lidar system, a distribution of secondary light incident from a field of view and imaged onto the detector unit, a center position and/or a width of the distribution are acquired as position data and compared especially with presumed and/or expected position data featuring an expected center position and/or an expected distribution.

Preferred refinements of the present invention are disclosed herein.

According to an additional or alternative perspective of the basic features of the present invention, it is provided in a method for calibrating and/or adjusting a lidar system that (i) (a) the lidar system is developed with a transmitter unit and a receiver unit, in particular featuring a presumed identical viewing angle and/or field of view, and/or (b) a region of the underlying detector unit is or will be assigned to each viewing angle of the transmitter unit via the optical imaging, (ii) for the measurement-based comparison, a field of view of the receiver unit is compared in a measuring manner with a field of view of the transmitter unit or with respective corresponding parts of the fields of view thereof, (iii) based on a result of the comparison, a deviation variable characteristic of a measure of a deviation of the fields of views of the transmitter unit and the receiver unit or the corresponding parts is determined and/or provided, and (iv) based on a value of the deviation variable, a correction variable characteristic of a measure of a required change in alignment of at least one of the fields of views of the transmitter unit and the receiver unit or the corresponding parts is determined and/or provided.

This means, among other things, that the transmitter unit emits primary light into the field of view during the operation, where it is possibly reflected and acquired and detected there by the receiver unit as secondary light. Due to the mutual alignment of the transmitter unit and the receiver unit for a respective visual angle, solid angle or viewing angle of the transmitter unit and the receiver unit, a certain intensity distribution of the received secondary light is expected at or in the underlying detector unit, that is, exhibiting certain intensities or distributions at certain detector positions, e.g., in the sense of macro pixels made up of individual channels and micropixels. Because of the deviation of the form and position of the actually measured distribution from the expected form and position of a distribution that would result if the transmitter unit and the receiver unit were aligned in a desired manner and optimally aligned with one another, in particular, the measure of an incorrect adjustment and furthermore the measure of a required readjustment or adaptation of the alignment of the transmitter unit and the receiver unit relative to each other can then be inferred.

In one advantageous refinement of the method according to the present invention, the alignment of at least one of the fields of view of the transmitter unit and the receiver unit or the corresponding parts is able to be modified in accordance with a value of the correction variable.

This may be accomplished by different measures:

On the one hand, according to another exemplary embodiment of the method of the present invention, it is possible that the change in an alignment is implemented electrically/electronically, such as by adapting (i) the evaluation and/or assignment of an underlying detector unit and/or its part to an evaluation, e.g., in the form of individual detector elements, sensor elements, individual photoelectric diodes or groups thereof.

As an alternative or in addition, it is possible that the change in an alignment (ii) is implemented by changing an assignment of an underlying detector unit and/or its parts, e.g., in the sense of individual detector elements, sensor elements, individual photoelectric diodes or groups thereof, to the field of view of the receiver unit and/or its parts.

In this context, parts of a field of view may also be understood as viewing angles, perspectives or corresponding angular ranges or solid angle ranges.

In addition to these purely electric, electronic, circuitry-wise or "organizational" adaptations, adaptations at the mechanical and/or optical level are also possible.

For example, according to another advantageous refinement of the method according to the present invention, it is possible that the change in an alignment is implemented mechanically and/or optically by actuating a mechanical and/or optical adjustment unit.

The individual adjustment unit may be designed and used for adapting (i) the position, alignment and/or orientation of an underlying detector unit and/or its parts, and/or (ii) for optically imaging secondary light from the field of view onto an underlying detector unit and/or its parts.

It is therefore particularly possible to adjust the optical components that lead to the imaging of the secondary light onto the detector unit for a new adjustment or readjustment, for instance by mechanically moving and aligning individual optical components.

According to another embodiment of the method according to the present invention, an especially high measure of accuracy during the process of the measurement-based comparison comes about if a distribution of the secondary light on the detector unit and/or a center position of the distribution is/are ascertained by scanning a multiplicity of macro pixels of the detector unit, which particularly have one or more individual channel(s) featuring a multiplicity of micropixels in the form of detector elements.

According to a further exemplary embodiment of the method according to the present invention, the adapting of an adjustment or alignment according to the present invention is able to be further improved in terms of the accuracy specifications by distinguishing between a useful signal of reflected secondary light and background noise, preferably through the use of (i) a threshold value for a signal level and/or (ii) a coincidence filter, the latter in particular considering the spatial and/or temporal signal form of the emitted primary light.

As a matter of principle, it is possible to carry out or use the method according to the present invention during and/or in parallel with the actual operation of the underlying lidar system.

As an alternative or in addition, it is also possible that the method according to the present invention is carried out as a separate operation, in particular including an intermediate storage and/or at a later point in time following the measuring operation, with regard to a normal operation of the underlying lidar system.

The method according to the present invention may thus be carried out as part of an operating method of the underlying lidar system, although this is not a requirement.

In addition, the present invention also relates to a control unit for a lidar system, which is designed to initiate, carry out, allow to run, regulate and/or control an embodiment of the method according to the present invention in an underlying lidar system.

Moreover, the present invention also provides a lidar system as such. It is designed with a transmitter unit for generating and emitting primary light into a field of view for its illumination, and with a receiver unit for receiving, detecting and evaluating secondary light from the field of view.

In addition, the lidar system is developed to be used with a method developed according to the present invention and/or to be controlled or regulated by such a method.

In addition or as an alternative, the lidar system has a control unit developed according to the present invention, which is designed to control the operation of the transmitter unit and/or the receiver unit of the underlying lidar system.

Finally, the present invention also provides a working device, which is developed with a lidar system according to the present invention.

The working device may be developed as a vehicle, in particular.

BRIEF DESCRIPTION OF THE DRAWINGS

Example embodiments of the present invention will be described in detail with reference to the figures.

DETAILED DESCRIPTION OF EXAMPLE EMBODIMENTS

Figure 1:
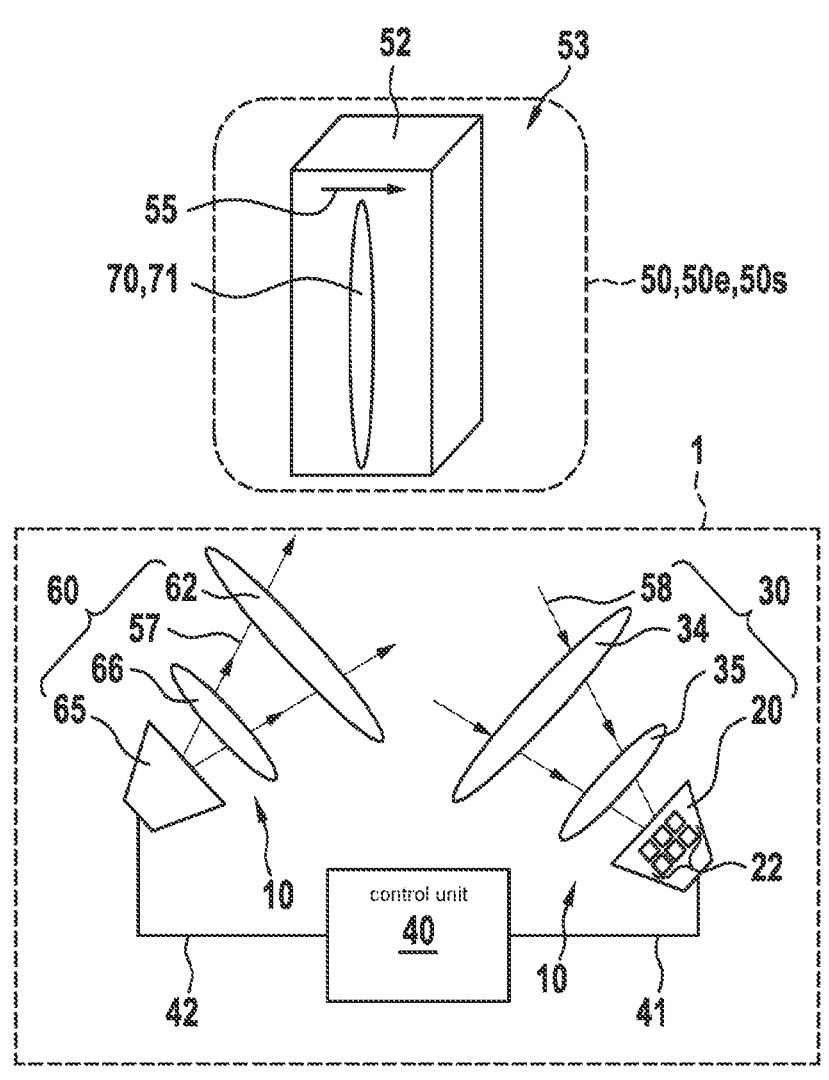
FIG. 1 shows a schematic representation of an example embodiment of a lidar system developed according to the present invention, which is able to be used in connection with the method according to the present invention.

In the following text, exemplary embodiments of the present invention and the technical background will be described in detail with reference to FIGS. 1 through 5. Identical and equivalent elements and components as well as elements and components acting in the same or an equivalent manner are described by the same reference numerals. The detailed description of the denoted elements and components is not provided in every occurrence of the elements and components.

The illustrated features and further properties are able to be combined in any desired form, in isolation from one another, or may be combined as desired without departing from the core of the present invention.

FIG. 1 schematically shows a representation of an embodiment of a lidar system 1 developed according to the present invention, which can be used in connection with the operating method according to the present invention.

Different aspects of lidar system 1 according to the present invention and shown in FIG. 1 are also already included in conventional lidar systems.

In current lidar sensors, a mutual mechanical alignment and adjustment of transmitter unit 60 and especially of light source unit 65 and, for instance, a laser and receiver unit 30, is undertaken during the production. The components are fixed in place in the process, e.g., bonded or screwed. The mutual alignment can normally not be detected during the operation. A compensation of component and adjustment tolerances is implemented, for instance by making the image size larger on the receiver side than the divergence of the underlying light source unit 65 and especially the laser used there as light source of light source unit 65.

Mechanical tolerances and thermally induced changes in position, among other things, can lead to a considerable reduction of the efficiency or performance in the range of lidar system 1 across the service life and as a function of the temperature.

Currently, this is usually compensated by an overfulfillment of the underlying specification at room temperature, a narrow temperature window, or via a tolerance margin, which leads to additional costs or a reduction of the nominal performance.

These disadvantages are able to be avoided according to the present invention.

At the outset, lidar system 1, generally developed according to the present invention and shown in FIG. 1, will be described.

It has a transmitter unit 60, which may also be understood as a transmitter optics, as well as a receiver unit 30, which may also be understood as a receiver optics.

A control unit 40 is advantageously developed, to which transmitter unit 60 and receiver optics 30 are actively connected via acquisition and control lines 41 and 42, respectively.

Transmitter unit 60 has a light source unit 65 for generating and emitting primary light 57, a beam-shaping optics 66 for shaping beams, as well as a deflection optics 62 for the actual emitting of primary light 57 into field of view 50 featuring scene 53, which may include an object 52, for instance.

As a matter of principle, it is possible to view field of view 50 in the context of actual field of view 50s of transmitter unit 60 and field of view 50e of receiver unit 30.

Receiver unit 30 has a primary optics 34, e.g., in the way of an object, and a secondary optics 35, e.g., having a receiver-side focusing optics.

Primary optics 34 and secondary optics 35 of receiver unit 30 are used to image secondary light 58 received from field of view 50 onto a detector array 20 for a detection with the aid of a multiplicity of sensor elements 22 or detector elements.

In the further operation of lidar system 1, a transmitter-side pivoting motion 55 causes sweeping of field of light 70 in field of view 50. If required, it is therefore possible to induce sweeping of a linear field of light 71 across scene 53 in field of view 50 with the aid of a transmitter-side pivoting motion such as in the sense of a sampling or scanning motion 73, e.g., in a horizontal direction.

As an alternative, the illumination of field of view 50 may be implemented by a surface field of light as field of light 70, e.g., in the way of a flash that illuminates entire field of view 50 at an instant, for example in the sense of a flash principle, and without a transmitter-side pivoting motion 55.

According to the present invention, within and/or outside the operation of lidar system 1, an acquisition of the distribution of received secondary light 58 and/or its center position in relation to the positioning of detector elements 22 is carried out on the receiver side within detector array 20 having the individual detector elements or sensor elements 22, for instance understood as a whole as receiver chips, as position data, for example. Because of the alignment of transmitter-side field of view 50s and of receiver-side field of view 50e or of corresponding parts thereof relative to one another, and/or by the assignment of corresponding transmitter-side viewing angles or intervals of transmitter-side viewing angles to regions of detector array 20 and the multiplicity of detector elements 22, a distribution, with a corresponding center position of the distribution, to the multiplicity of detector elements 22 is expected according to the present invention and is able to be compared to the actually measured distribution and center position to then derive a variable therefrom that is characteristic of the deviation of the actual alignment from a desired alignment, which may then be used for adapting the alignment of transmitter unit 60 and receiver unit 30 relative to one another.

A core aspect according to one aspect of the present invention consists of the provision, development and use of a measuring operation, possibly using a measuring device, e.g., within an underlying receiver chip, understood as detector array 20 according to the present invention featuring a multiplicity of detector elements or sensor elements 22, for acquiring a center position and/or distribution of the light reflected from the environment and received as secondary light 58 from the reflection of the laser light of transmitter unit 60.

As previously mentioned already, this information pertaining to the distribution and center position of the received secondary light is regarded as position data and, to a considerable extent, is a function of the mutual alignment of transmitter 60 and receiver 30 of lidar system 1.

According to one embodiment of the present invention, these position data are able to be acquired in parallel with normal lidar measurements and utilized for an evaluation and/or position correction.

The position correction may be implemented either (i) mechanically-optically (for instance induced via the mirror position) or (ii) electrically or electronically (for instance utilizing other receive pixels).

One advantage of the procedure according to the present invention is that a specified range is attainable also across the service life and with temperature changes without the need to provide a tolerance margin. In addition, it may perhaps be possible to completely omit an initial alignment step during the production, which normally has to be carried out.

Figure 2:
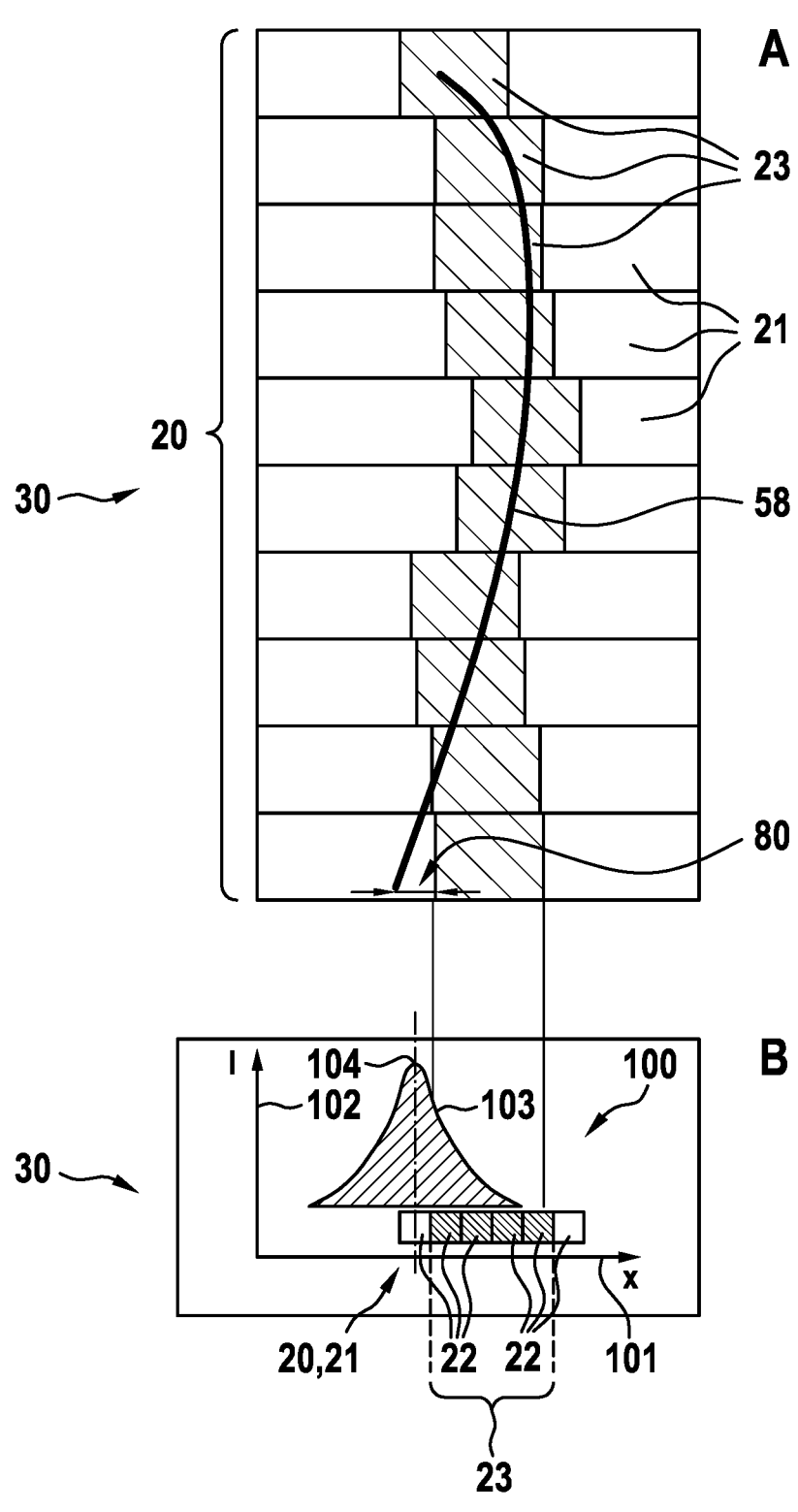
FIGS. 2A and 2B show a description, based on schematic views, the problem with regard to the intensity distribution of secondary light at the detector in an adjustment and incorrect adjustment between the transmitter unit and the receiver unit, FIG. 3 schematically shows based on a graph the position of an intensity distribution of secondary light at the detector in an adjustment and incorrect adjustment between the transmitter unit and the receiver unit.

With the aid of partial FIGS. 2A and 2B, FIG. 2 describes the problem by way of example in a top view and a sectional side view.

Secondary light 58 from field of view 50 impinges upon receiver 30 and especially upon detector array 20 having the multiplicity of detector elements or sensor elements 22. The location and the width of the intensity distribution may differ within receive lines 21, which correspond to a pixel in each case.

Shown are the different detector lines 21 of detector array 20, each line 21 functioning as a pixel and being formed by a multiplicity of detector elements 22. Shown is also an initial macro pixel 23, which is likewise formed by a multiplicity of adjacently situated detector elements 22 and, as a central element, represents the expected center position of a distribution of received secondary light 58.

In reality, however, a deviation 80, for instance in the sense of a physical separation of the actual center position of the distribution of secondary light 58 in comparison with the center position to be expected and represented by initial macro pixel 23 may occur, as illustrated in the bottommost line of the representation of FIG. 2A.

By way of example and in the form of a graph 100, the cross-sectional representation of FIG. 2B shows by track 103 the distribution of intensity I of secondary light 58 as a function of the location, the latter being represented by the positioning of individual pixels 22, especially by the position of initial macro pixel 23. Center position 104 of distribution 103 clearly lies outside initial macro pixel 23, and its position in relation to macro pixel 23 is able to be utilized to acquire the deviation of the adjustment between transmitter unit 60 and receiver unit 30 in quantitative terms.

In connection with graph 100 of FIG. 2B, location x, represented by the position of detector elements 22 or micropixels 22, is plotted on abscissa 101, and intensity I of secondary light 58 received in detector array 20 is plotted on ordinate 102.

Figure 3:
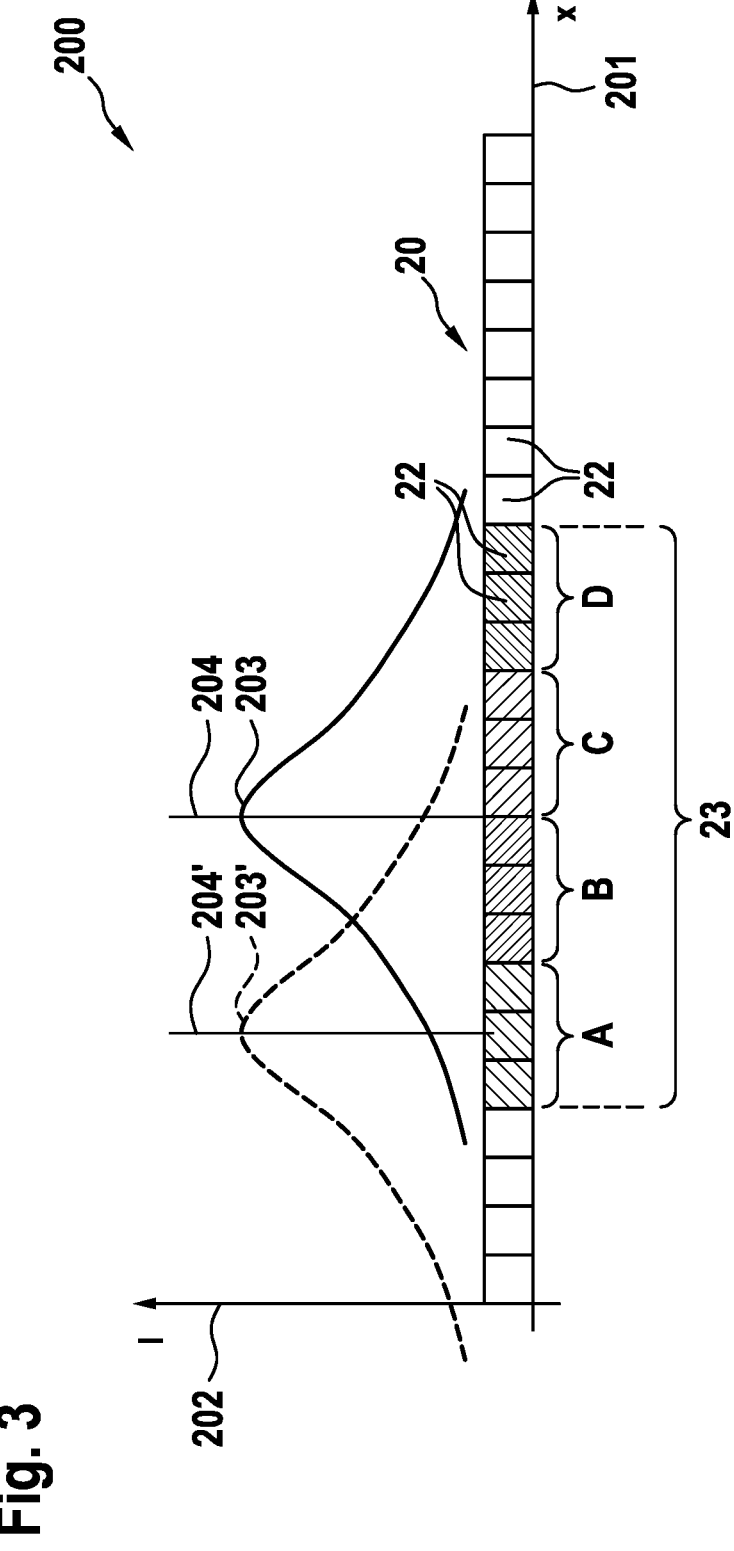

In the illustrated solution, the light distribution is able to be generated by way of example by scanning or sampling the received signal by four channels A to D, which form a macro pixel 23 with individual detector elements or micropixels 22 as illustrated in connection with graph 200 of FIG. 3. In this way, both the center position, the width as well as the slope of distribution 103 of secondary light 58 are able to be ascertained so that the quality of the degree of an incorrect adjustment between transmitter unit 60 and receiver unit 30 can be ascertained and acquired in quantitative terms.

In connection with graph 200 of FIG. 3, location x, once again represented by the position of the individual detector elements 22, understood as micropixels, has been plotted on abscissa 201, and intensity I of secondary light 58 received in detector array 20 has been plotted on ordinate 202. Track 203 shows the intensity distribution for a desired alignment between transmitter unit 60 and receiver unit 30, center position 204 of intensity distribution 203 being situated in the center of macro pixel 23 made up of channels A to D.

In contrast, distribution 203' shows a center position 204' featuring a main position on channel A, from which the extent of the incorrect adjustment between transmitter unit 60 and receiver unit 30 is able to be inferred based on the distance between center positions 204 and 204'.

Figure 4:
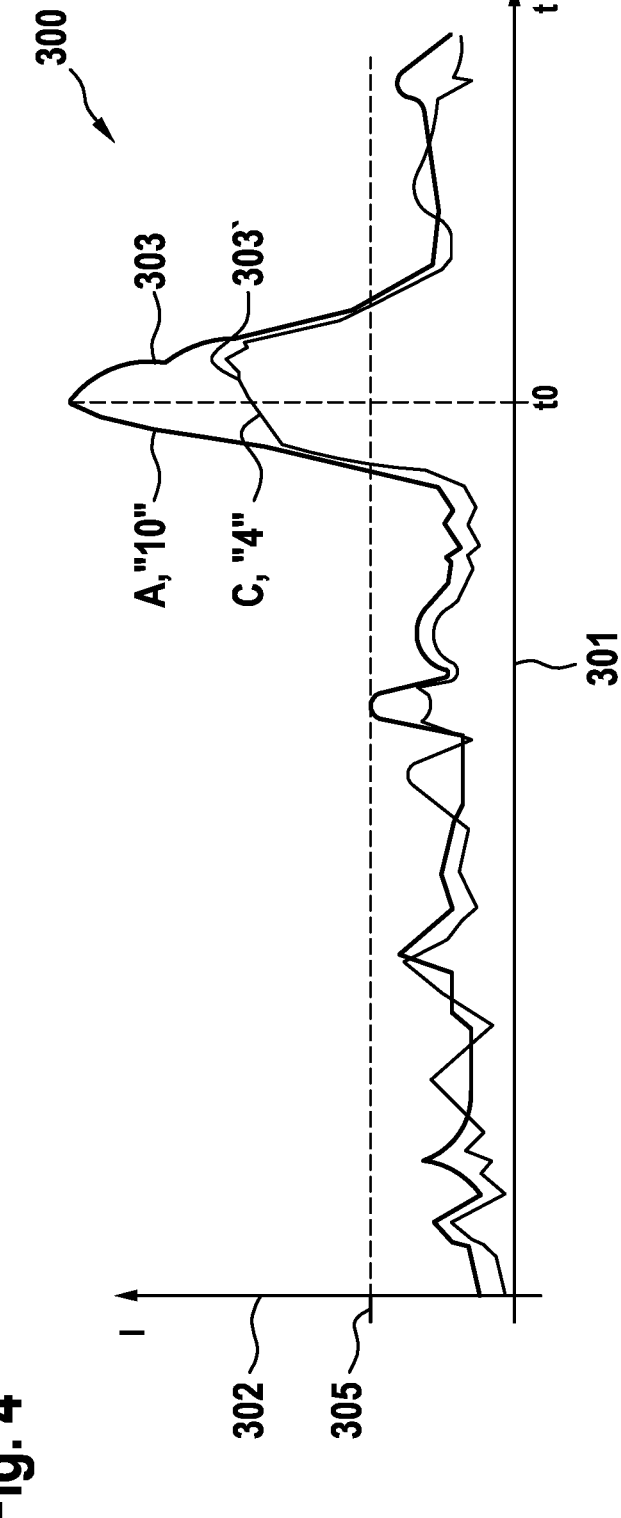
FIGS. 4 and 5 show, based on a graph or a schematic circuit diagram, aspects of the differentiation between a useful signal and background noise.

To distinguish the reflected useful signal—i.e., secondary light 58, which comes from the reflection of primary light 57 from field of view 50—from background noise, a threshold value method, for instance, may be implemented according to graph 300 from FIG. 4, or a coincidence filter.

In the context of graph 300 from FIG. 4, time t is plotted on abscissa 301, and intensity I of secondary light 58 received in detector array 20 is plotted on ordinate 302. At a given instant t0, secondary light 58 is detected in detector array 20 in the different channels A to D. Tracks 303 and 303' demonstrate the time characteristic of the receive signal for intensity I in channels A to C. Based on the comparison of the maxima with relative intensity indications "4" and "10" at instant t0, it is possible to derive that the center position of the detected intensity distribution roughly corresponds to characteristic 203' featuring center position 204' from FIG. 3.

Figure 5:
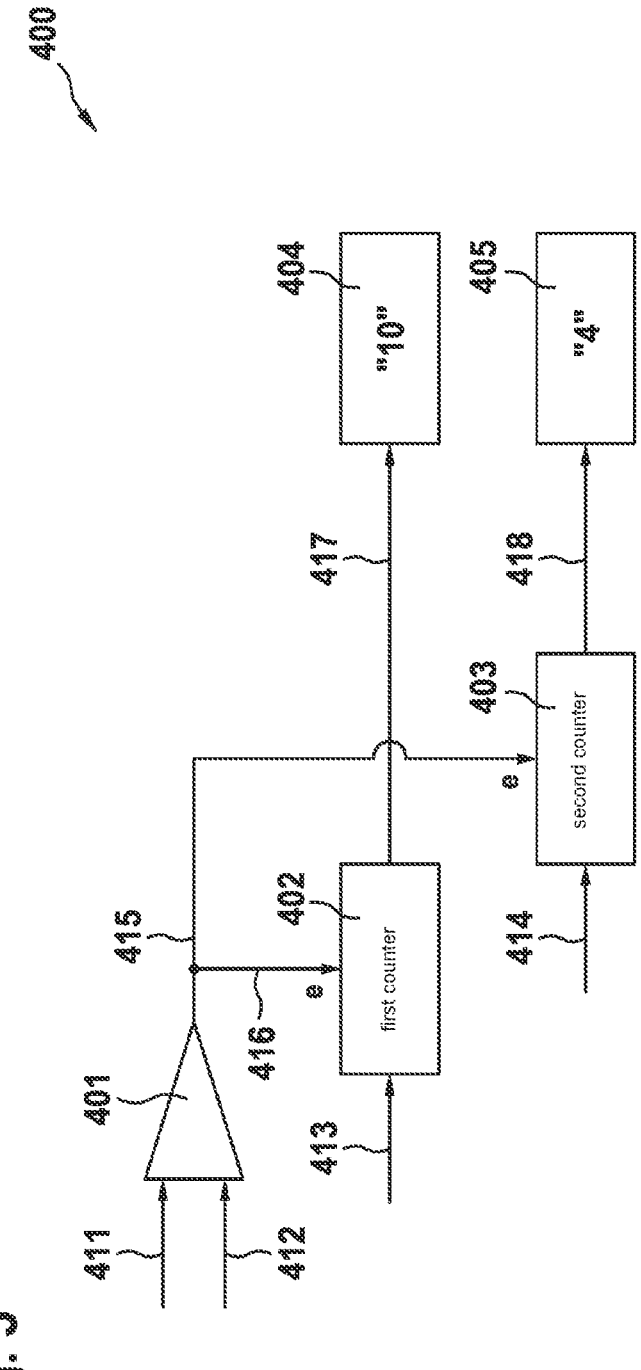

Also shown is threshold value 305 for discriminating between the useful signal and the basic noise. Only signals that lie above threshold value 305 are permitted as a detection signal. FIG. 5, by way of a schematic block diagram, shows an evaluation logic 400 for ascertaining the light distribution from a two-channel measurement as was illustrated in connection with FIG. 4.

The scanned signal is able to be evaluated as a digital signal at the runtime, as illustrated in connection with evaluation logic 400 of FIG. 5, or it may first be stored and processed afterwards. Since the position determination may be carried out in parallel with the lidar measurement, it is able to be performed across the entire field of view or FoV 50. The correction may thus adjust the position and variable of receiver 30 also as a function of the direction (horizontal and vertical).

In connection with the block diagram of FIG. 5 and the evaluation logic 400 shown there, it should be noted that a comparator 401 is developed there in cooperation with a first counter 402 and a third counter 403.

The instantaneous value of monitored macro pixel 23 and a value representative of the noise level are conveyed to inputs 411 and 412 of comparator 401. The comparison will decide whether or not the acquired measured value lies above the threshold value for the noise analysis and thus whether an enable signal e appears at output 415, 416 of comparator 401 and is output to first and second counters 402 and 403 in order to consider the signals, applied at their inputs 413 and 414, of left and right channels for the summation, so that the results 404 and 405 with the values "10" and "4" ultimately appear at outputs 417 and 418 of first and second counters 402 and 403.

What is claimed is:

1. A method for calibrating and/or adjusting a lidar system, comprising the following steps:
   acquiring, as position data, a distribution of secondary light incident from a field of view and imaged onto an underlying one-dimensionally or two-dimensionally detecting detector unit, and: (i) a center position of the distribution and/or (ii) a width of the distribution, to perform a measurement-based comparison with respect to the underlying detector unit; and
performing the measurement-based comparison by comparing the acquired position data with presumed and/or expected position data including an expected center position and/or an expected distribution;
wherein the distribution of the secondary light on the underlying detector unit and/or the center position of the distribution is ascertained by scanning a multiplicity of macro pixels of the underlying detector unit, which have one or more individual channels including a multiplicity of micropixels in the form of detector elements.

2. The method as recited in claim 1, wherein:
(i) (a) the lidar system includes a transmitter unit and a receiver unit having a presumed identical viewing angle and/or field of view, and/or (b) a region of an underlying detector unit is assigned to each viewing angle of the transmitter unit via an optical imaging,
(ii) for the measurement-based comparison, a field of view of the receiver unit is compared in a measuring manner with a field of view of the transmitter unit or with respective corresponding parts of the fields of view of the transmitter unit,
(iii) based on a result of the comparison, a deviation variable that is characteristic of a measure of a deviation of the fields of view of the transmitter unit and the receiver unit or the corresponding parts is determined, and
(iv) based on a value of the deviation variable, a correction variable characteristic of a measure of a required change in an alignment of at least one of the fields of view of the transmitter unit and the receiver unit or the corresponding parts is determined and provided.

3. The method as recited in claim 2, wherein an alignment of at least one of the fields of view of the transmitter unit and the receiver unit or the corresponding parts is modified in accordance with a value of the correction variable.

4. The method as recited in claim 2, wherein a change in the alignment is implemented electrically/electronically (i) by adapting an evaluation of the underlying detector unit and/or parts of the underlying detector, and/or (ii) by adapting an assignment of the underlying detector unit and/or parts of the underlying detector to the field of view of the receiver unit and/or to parts of the receiver unit.

5. The method as recited in claim 2, wherein a change in the alignment is implemented mechanically and/or optically by actuating a mechanical and/or optical adjustment unit for adapting (i) a position and/or alignment and/or orientation of the underlying detector unit and/or parts of the underlying detector unit, and/or (ii) an optical imaging of secondary light from the field of view onto the underlying detector unit and/or parts of the underlying detector unit.

6. The method as recited in claim 1, wherein a distinction is made between a useful signal of reflected secondary light and background noise by use of (i) a threshold value for a signal level and/or (ii) a coincidence filter.

7. The method as recited in claim 1, wherein the steps of the method are carried out:
   during a normal operation and/or in parallel with a normal operation of the underlying lidar system, and/or
   as a separate operation, with an intermediate storage and/or at a later point in time following the measuring operation, to the normal operation of the lidar system as part of an operating method of the lidar system.

8. A control unit for a lidar system, the control unit configured to calibrate and/or adjust a lidar system, the control unit configured to:

acquire, as position data, a distribution of secondary light incident from a field of view and imaged onto an underlying one-dimensionally or two-dimensionally detecting detector unit, and: (i) a center position of the distribution and/or (ii) a width of the distribution, to perform a measurement-based comparison with respect to the underlying detector unit; and perform the measurement-based comparison by comparing the acquired position data with presumed and/or expected position data including an expected center position and/or an expected distribution;

wherein the distribution of the secondary light on the underlying detector unit and/or the center position of the distribution is ascertained by scanning a multiplicity of macro pixels of the underlying detector unit, which have one or more individual channels including a multiplicity of micropixels in the form of detector elements.

9. A lidar system, comprising:

a transmitter unit configured to generate and emit primary light into a field of view for its illumination;

a receiver unit configured to receive, detect and evaluate secondary light from the field of view; and a control unit configured to calibrate and/or adjust the lidar system, the control unit configured to:

acquire, as position data, a distribution of secondary light incident from a field of view and imaged onto an underlying one-dimensionally or two-dimensionally detecting detector unit, and: (i) a center position of the distribution and/or (ii) a width of the distribution, to perform a measurement-based comparison with respect to the underlying detector unit; and perform the measurement-based comparison by comparing the acquired position data with presumed and/or expected position data including an expected center position and/or an expected distribution;

wherein the distribution of the secondary light on the underlying detector unit and/or the center position of the distribution is ascertained by scanning a multiplicity of macro pixels of the underlying detector unit, which have one or more individual channels including a multiplicity of micropixels in the form of detector elements.

10. A vehicle, comprising a lidar system, the lidar system including:

a transmitter unit configured to generate and emit primary light into a field of view for its illumination;

a receiver unit configured to receive, detect and evaluate secondary light from the field of view; and a control unit configured to calibrate and/or adjust the lidar system, the control unit configured to:

acquire, as position data, a distribution of secondary light incident from a field of view and imaged onto an underlying one-dimensionally or two-dimensionally detecting detector unit, and: (i) a center position of the distribution and/or (ii) a width of the distribution, to perform a measurement-based comparison with respect to the underlying detector unit; and perform the measurement-based comparison by comparing the acquired position data with presumed and/or expected position data including an expected center position and/or an expected distribution;

wherein the distribution of the secondary light on the underlying detector unit and/or the center position of the distribution is ascertained by scanning a multiplicity of macro pixels of the underlying detector unit, which have one or more individual channels including a multiplicity of micropixels in the form of detector elements.

* * * * *